(12) United States Patent
Liu et al.

(10) Patent No.: US 11,218,086 B2
(45) Date of Patent: Jan. 4, 2022

(54) POWER CONVERSION SYSTEMS AND METHODS

(71) Applicant: Hamilton Sundstrand Corporation, Charlotte, NC (US)

(72) Inventors: Bo Liu, Vernon, CT (US); Xin Wu, Glastonbury, CT (US); Yongduk Lee, Vernon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/827,528

(22) Filed: Mar. 23, 2020

(65) Prior Publication Data

US 2021/0297009 A1    Sep. 23, 2021

(51) Int. Cl.

| | |
|---|---|
| *H02M 7/5395* | (2006.01) |
| *H02M 7/487* | (2007.01) |
| *H02M 7/5387* | (2007.01) |
| *H02P 27/14* | (2006.01) |
| *H02P 6/08* | (2016.01) |
| *H02M 3/335* | (2006.01) |
| *H02M 1/00* | (2006.01) |

(52) U.S. Cl.
CPC ..... *H02M 7/5395* (2013.01); *H02M 3/33507* (2013.01); *H02M 7/487* (2013.01); *H02M 7/5387* (2013.01); *H02P 6/08* (2013.01); *H02P 27/14* (2013.01); *H02M 1/007* (2021.05)

(58) Field of Classification Search
CPC ............. H02M 7/5395; H02M 7/5387; H02M 3/33507; H02M 7/487; H02M 1/007; H02P 6/08; H02P 27/14
See application file for complete search history.

(56) References Cited

U.S. PATENT DOCUMENTS

| | | |
|---|---|---|
| 9,236,828 B1 | 1/2016 | Wei et al. |
| 10,778,114 B2 * | 9/2020 | Lu .................... H03K 17/04123 |

(Continued)

FOREIGN PATENT DOCUMENTS

| | | |
|---|---|---|
| EP | 2611021 A1 | 7/2013 |
| WO | 201923686 | 12/2019 |

OTHER PUBLICATIONS

Extended European Search Report dated Aug. 5, 2021, issued during the prosecution of European Patent Application No. EP 21164417.4.

*Primary Examiner* — Kyle J Moody
(74) *Attorney, Agent, or Firm* — Locke Lord LLP; Scott D. Wofsy; Alicia J. Carroll

(57) ABSTRACT

A power conversion system includes a hybrid power converter phase unit including three voltage inputs, a voltage output, a pair of outer switches between the voltage inputs and voltage output, and a pair of inner switches between the voltage inputs and the outer switches. The power conversion system includes a controller in electrical communication with the inner and outer switches. The controller is configured to selectively disable or enable the inner switches by switching the inner switches OFF or ON. A method includes selectively disabling or enabling inner switches in a hybrid power converter phase unit with a controller such that the hybrid power converter phase unit is a 3-level converter when the inner switches are ON and enabled in a 3-level mode and a 2-level converter when the inner switches are OFF and disabled in a 2-level mode.

18 Claims, 5 Drawing Sheets

(56) References Cited

U.S. PATENT DOCUMENTS

| | | |
|---|---|---|
| 2004/0145338 A1 | 7/2004 | Nakamura et al. |
| 2011/0080147 A1* | 4/2011 | Schoenlinner .......... H02J 3/381 |
| | | 323/282 |
| 2013/0076152 A1* | 3/2013 | Nielsen .................. H02M 5/40 |
| | | 307/82 |
| 2013/0107599 A1* | 5/2013 | Shekhawat ........... H02M 7/487 |
| | | 363/131 |
| 2014/0233290 A1 | 8/2014 | Spanos et al. |
| 2019/0238062 A1 | 8/2019 | Lu et al. |
| 2019/0348924 A1 | 11/2019 | Kumar et al. |
| 2020/0028448 A1* | 1/2020 | Kshirsagar ............ H02M 7/483 |
| 2021/0119449 A1* | 4/2021 | Wang ...................... H02J 3/004 |
| 2021/0143750 A1* | 5/2021 | Mondal .................. H02M 1/42 |

* cited by examiner

POWER CONVERSION SYSTEMS AND METHODS

BACKGROUND

1. Field

The present disclosure relates to power systems, and more particularly to power converters.

2. Description of Related Art

Aircraft systems or electric vehicles often require electric motors to operate with high torque and low speed during the takeoff, climb, and startup stages. During these low speed operation stages, a motor controller connected to the electric motor operates at very low modulation index with extremely high duty cycle for certain power devices, meanwhile a motor drive has to provide very high phase current to support high torque. This leads to high average and root mean squared (RMS) current and conduction loss on those power devices. In turn, this may lead to high thermal stress on the major components of the motor drive-power semiconductor devices, which often requires additional cooling, additional thermal management, and/or oversized power devices.

The conventional techniques have been considered satisfactory for their intended purpose. However, there is an ever present need for improved systems and methods for power conversion. This disclosure provides a solution for this need.

SUMMARY

A power conversion system includes a hybrid power converter phase unit including three voltage inputs, a voltage output, a pair of outer switches between the voltage inputs and voltage output, and a pair of inner switches between the voltage inputs and the outer switches. The power conversion system includes a controller in electrical communication with the inner and outer switches. The controller is configured to selectively disable or enable the inner switches by switching the inner switches OFF or ON.

The inner switches can be connected in series with one another. The outer switches can be connected in series with one another. The controller can be configured to disable the inner switches when a current at the voltage inputs is within a disable threshold. The controller can be configured to enable the inner switches when a current at the voltage inputs are outside of a disable threshold. The outer switches can form a half-bridge module. The inner switches can form a common source module. The system can include a second hybrid power converter phase unit and a third hybrid power converter phase unit to form a three-phase power converter. The second and third hybrid power converter phase units can be in electrical communication with the controller. The inner switches can be connected in series with one another. The outer switches can be connected in series with one another. The hybrid power converter phase unit can have a T-type topology, where the inner switches can form a common source module and the outer switches can form a half-bridge module. The hybrid power converter phase unit can have an active neutral pointed clamped converter (ANPC) topology, where the inner switches can form a half-bridge module and each outer switch itself can include a series-controlled half-bridge module.

In accordance with another aspect, an aircraft electrical system includes a power conversion system including a hybrid power converter phase unit and a controller in electrical communication with the hybrid power converter phase unit. The hybrid power converter phase unit includes three voltage inputs, a voltage output, a pair of outer switches between the voltage inputs and voltage output, and a pair of inner switches between the voltage inputs and the outer switches. The controller is in electrical communication with the inner switches and is configured to selectively disable or enable the inner switches. The aircraft electrical system includes a DC-DC converter in electrical communication with the hybrid power converter phase unit to provide voltage to at least one of the negative or positive voltage inputs. The aircraft electrical system includes a battery bank in electrical communication with the DC-DC converter to provide power thereto. In some system applications, the DC-DC converter can also be removed.

The inner switches can be connected in series with one another. The outer switches can be connected in series with one another. The inner switches can be common source switches. The power conversion system can include a second hybrid power converter phase unit and a third hybrid power converter phase unit, both can be in electrical communication with the controller.

In accordance with another aspect, a method includes selectively disabling or enabling inner switches in a hybrid power converter phase unit with a controller such that the hybrid power converter phase unit is a 3-level converter when the inner switches are ON and enabled in a 3-level mode and a 2-level converter when the inner switches are OFF and disabled in a 2-level mode.

Selectively disabling or enabling can include disabling or enabling pulse-width modulation (PWM) signals of the inner switches. Selectively disabling or enabling can include enabling the inner switches if an absolute value of a measured current is less than a pre-determined value. Selectively disabling or enabling can include disabling the inner switches if an absolute value of a measured current is greater than a pre-determined value. The method can include series-controlling outer switches in the hybrid power converter phase unit to withstand a full DC voltage in the 2-level mode without overvoltage stress concern, wherein the hybrid power converter phase unit has an ANPC topology.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
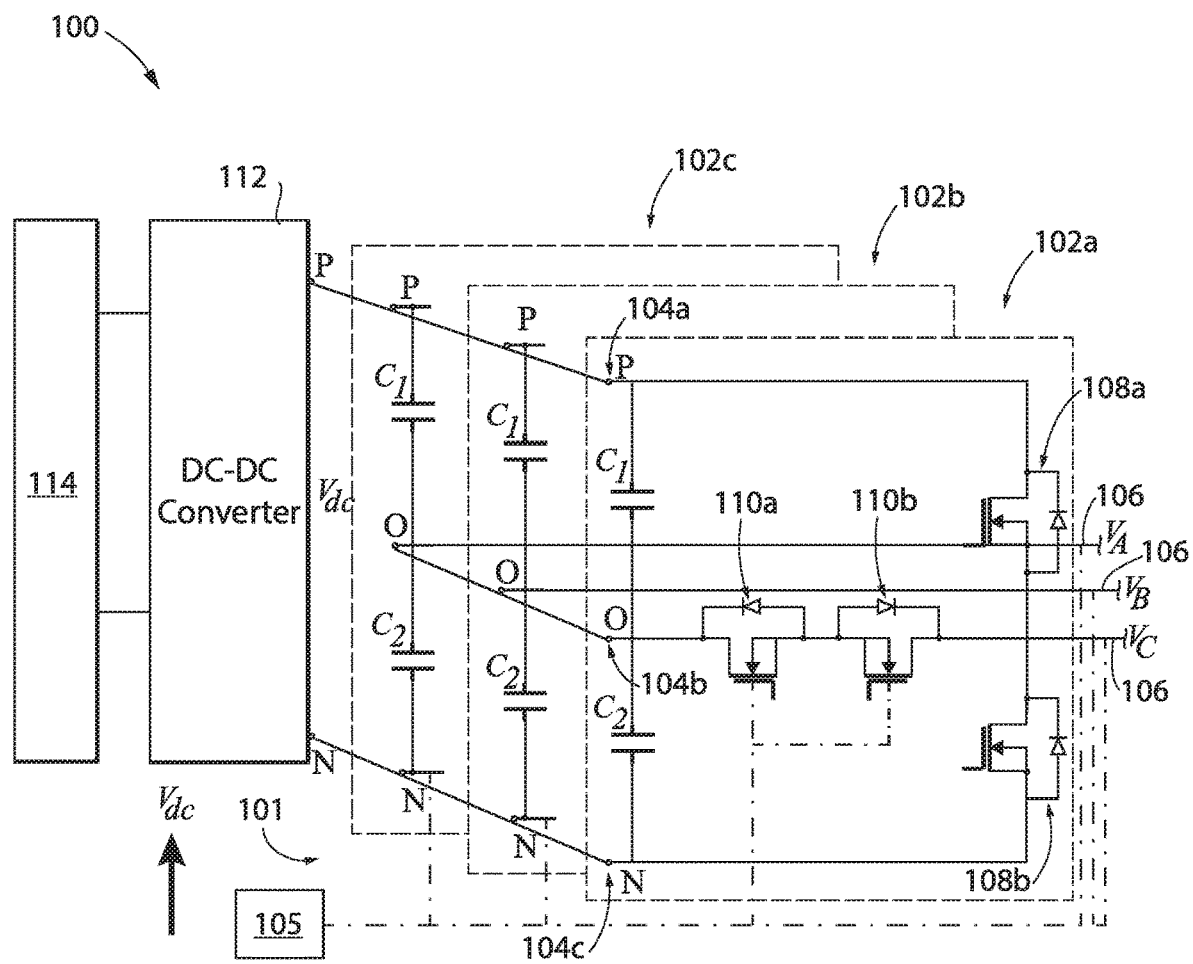
FIG. 1 is a schematic view of an embodiment of a system for electric propulsion constructed in accordance with the present disclosure, showing a three-phase hybrid power conversion system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are shown in FIGS. 2A-4B and described below. The systems and methods described herein provide for a power monitoring relay system with overcurrent and frequency protection that acts to maintain the power quality, while providing independence and segregation from the main control/protection system.

As shown in FIG. 1, an electrical system 100, e.g. an aircraft electrical system, includes a three-phase power conversion system 101 (e.g. which is also, in the context of certain aircraft systems, is called a motor controller) made of three hybrid power converter phase units 102a-102c and a controller 105 in electrical communication with each unit 102a-102c, or more phase units if needed. Communication between controller 105 and various components is indicated schematically by broken lines. Aircraft electrical system 100 includes a DC-DC converter 112 in electrical connection with hybrid power converter phase units 102a-102c to provide voltage to at least one of two voltage inputs 104a and/or 104c. Aircraft electrical system 100 includes a battery bank 114 in electrical connection with DC-DC converter 112 to provide power thereto. It is also contemplated that battery bank 114 could be a super capacitor bank. Both three-level (3L) and two-level (2L) converters are popular and widely used in motor-controllers, e.g. power conversion system, for electric propulsion, e.g. such as that used in electric vehicles, and aerospace systems. At a low-speed and high-torque operating condition, hybrid power converter phase units which could be embodied by existing three-level converters such as T-type converter units 102a-102c enable the hybrid operation of 2L and 3L converters sharing the same hardware, thereby reducing the thermal stress, among other things.

With reference now to FIGS. 1-3B, each hybrid power converter phase unit 102a-102c includes three DC voltage inputs 104a-104c, an AC voltage output 106, a pair of outer switches 108a and 108b, and a pair of inner switches 110a-110b. The pair of inner switches 110a-110b is between the voltage inputs 104a and the outer switches 108a-108b. The pair of outer switches 108a is between the DC voltage input 104a and AC voltage output 106. AC voltage output 106 is in electrical connection with a motor, not shown. The controller 105 is in electrical communication with inner switches 110a-110b and outer switches 108a-108b for each hybrid power converter phase unit 102a-102c and is configured to selectively disable or enable, e.g. turn OFF or ON, the inner switches 110a-110b and control outer switches 108a-108b accordingly. The inner switches 110a-110b for a given power converter, e.g. 102a, are connected in series with one another. The outer switches 108a-108b for a given power converter phase unit, e.g. 102a, are connected in series with one another. The inner switches 110a-110b can be common source (CS) switches and form a CS module, as shown in the embodiment of FIG. 2A.

Figure 4A:
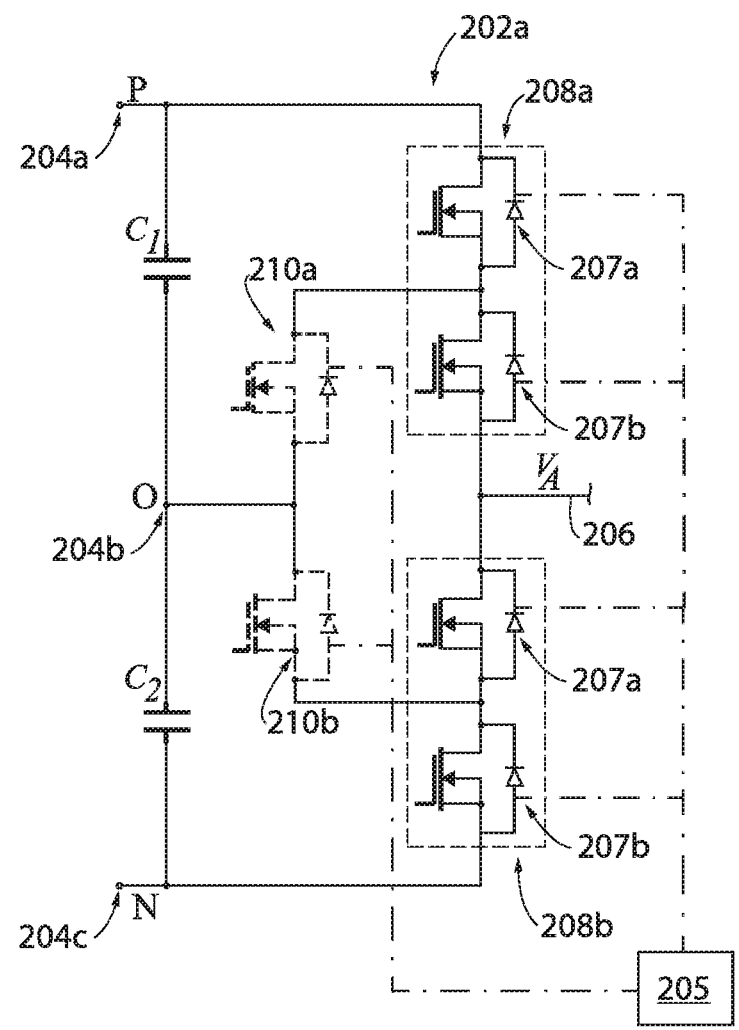
FIG. 4A is schematic depiction of another embodiment of a single hybrid power converter phase unit constructed in accordance with the present disclosure in the 2L mode, showing an active neutral pointed clamped converter (ANPC) topology where the inner switches form a half-bridge module and the outer switches form two half-bridge modules in series.
Figure 4B:
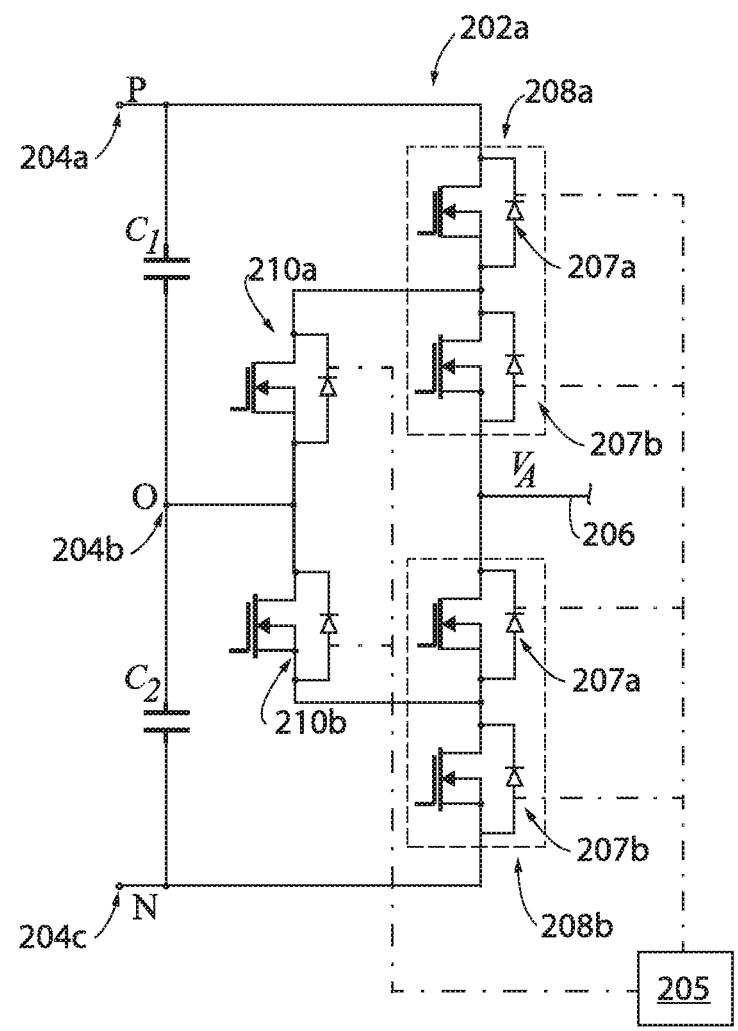
FIG. 4B is the single hybrid power converter phase unit of FIG. 4A in 3L mode.

As shown in FIGS. 4A-4B, a power converter phase unit 202a has an active neutral pointed clamped (ANPC) topology where inner switches 210a and 210b form a half-bridge module and outer switches 208a and 208b each form a respective pair of series connected devices 207a and 207b, e.g. switches, FETs or the like. This varies from power converter phase unit 102a of FIGS. 2A-2B, where outer switches 108a-108b form a half-bridge (HB) module. It is contemplated that other types of hybrid converter embodiments can be possible. Each pair of series-connected devices 207a and 207b form a half-bridge module, e.g. switch 208a or 208b. Additional phase units the same as unit 202a can be used (similar to system 101).

With continued reference to FIGS. 4A-4B, converter phase unit 202a can be used in conjunction with or in lieu of any of converter phase units 102a-102c in system 101. Switches 210a-210b are shown in broken lines to indicate disabled (e.g. switched OFF) mode in FIG. 4A, where converter 202a operates as a 2-level converter. Switches 210a-210b are shown in solid lines to indicate enabled (e.g. ON) mode in FIG. 4B, where converter operates as a 3-level converter. This hybrid approach redistributes current stress, thereby alleviating thermal stress of switches 210a-210b. A controller 205 is in electrical communication with converter unit 202a to provide similar commands/control as controller 105, as described above and below. Communication between controller 205 and various components is indicated schematically by broken lines. Hybrid power converter phase unit 202a includes three DC voltage inputs 204a-204c and an AC voltage output 206, similar to DC voltage inputs 104a-104c and AC voltage output 106. The disabled period/enabled period for unit 202a over a given angle span for a given current can be similar to unit 102a, described below.

Figure 2A:
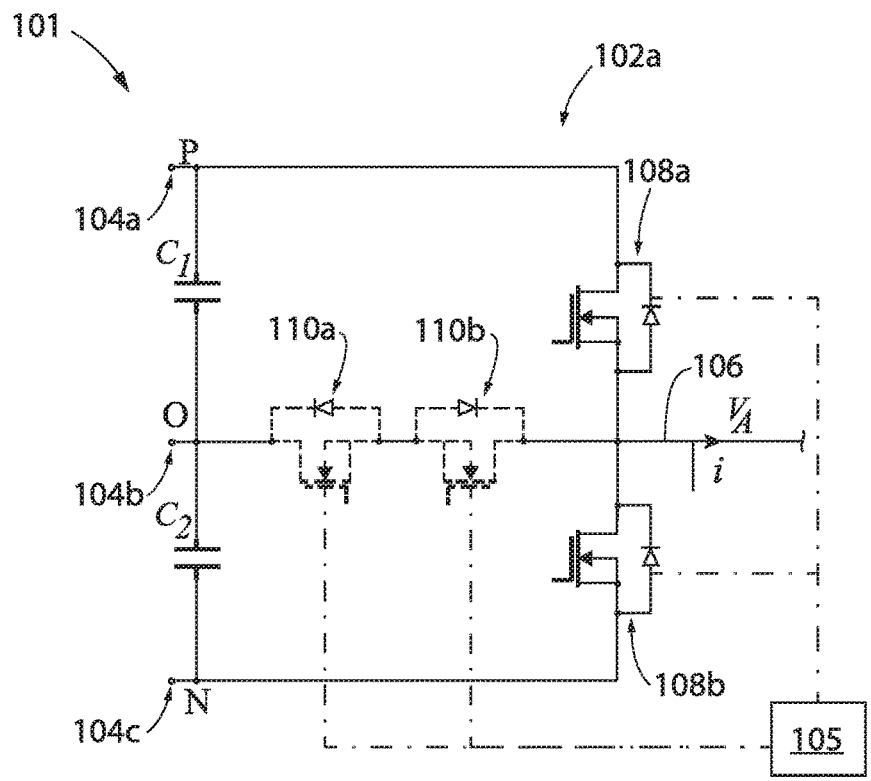
FIG. 2A is a schematic depiction of an embodiment of a single hybrid power converter phase unit constructed in accordance with the present disclosure, showing the hybrid power converter phase unit in 2L mode.
Figure 2B:
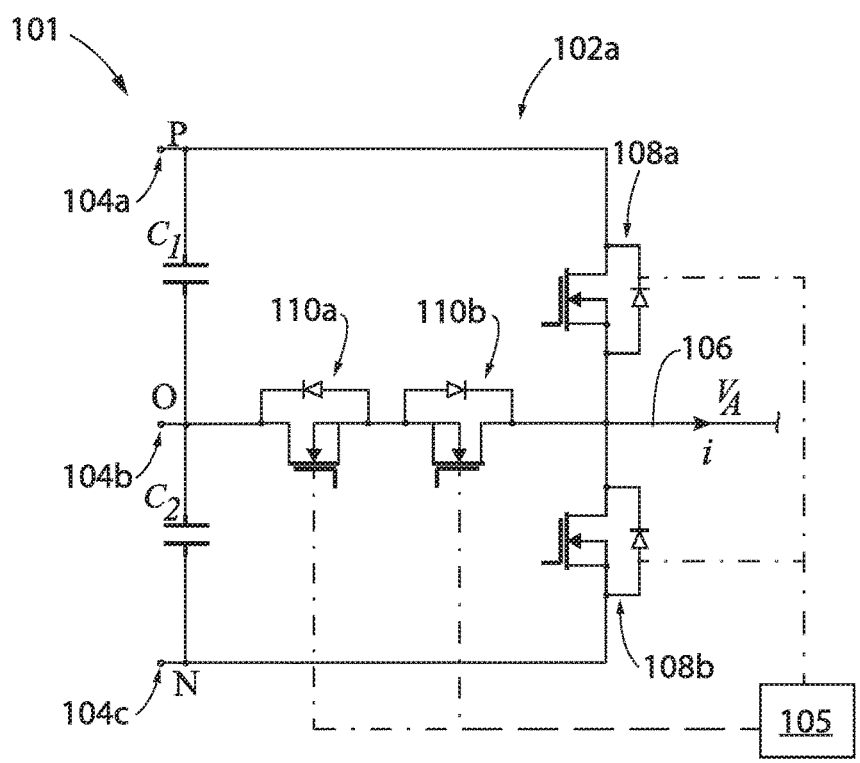
FIG. 2B is a schematic depiction of an embodiment of a single hybrid power converter phase unit constructed in accordance with the present disclosure, showing the hybrid power converter phase unit in 3L mode.
Figure 2C:
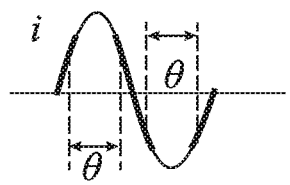
FIG. 2C is a graphical depiction of the transition between 2L and 3L mode in for a single hybrid power converter phase unit constructed in accordance with the present disclosure.

As shown in FIGS. 2A and 2C, in 2L mode, the controller 105 disables, e.g. turns OFF, the PWM signals of inner switches 110a-110b (e.g. the CS switches) and converter 102a operates as a typical 2L voltage source inverter. The controller 105 disables all of inner switches 110a-110b when a current (i) at voltage output 106 is within a disable threshold, e.g. as shown in Equation 2 below. Switches 110a-110b are shown in broken lines to indicate disabled (e.g. switched OFF) mode in FIG. 2A. As shown in the graphical depiction of FIG. 2C, inner switches 110a-110b for converter 102a are disabled over a given angle span θ when the current (i) at voltage output 106 is proximate to the peak and/or valley. The disabled period is shown schematically by dashed lines in FIG. 2C. During this period, the outer switches 108a-108b in the particular power converter phase unit are controlled as 2L half bridge converter.

As shown in FIGS. 2B-2C, the controller 105 is configured to enable the inner switches 110a-110b when the current (i) at the voltage inputs 104a-104c are outside of a disable threshold, e.g. as shown in Equation 3 below. Switches 110a-110b are shown in solid lines to indicate enabled mode in FIG. 2B. As shown in the graphical depiction of FIG. 2C, inner switches 110a-110b for converter 102a are enabled over a given angle span (180-θ) for each half line cycle when the current (i) at voltage output 106 is between to the peak and valley. The enabled period is shown schematically by solid lines in FIG. 2C. This hybrid approach redistributes current stress, thereby alleviating thermal stress of CS modules (e.g. made up of switches 110a-110b).

In some embodiments, DC-DC converter 112 provides further alleviation by lowering a DC link voltage at the voltage inputs 104a-104c (or voltage inputs 204a-204c if converter unit 202a is used). In these embodiments, the DC-DC converter 112 itself provides more control flexibility and functionalities to the overall electrical system 100, such as charging/discharging of batteries or super-capacitors 114, fault-limiting (for certain topologies), providing for more control freedom to inner switches 110a-110b as the voltage or DC current of the DC energy input source has been already controlled by the DC-DC stage. In system 100, lowering the DC link voltage increases the modulation index of power conversion system 101 at low speed motor operation, thus reducing the current stress in the CS module (which includes inner switches 110a-110b) and shifts certain current loading to the HB module (which includes outer switches 108a and 108b). Lowering the DC link voltage also reduces the switching loss of the HB and CS modules, especially for the HB module. Together, the hybrid approach and the inclusion of DC-DC converter reduces the overall loss of the converter units 102a-102c and avoids extra cooling efforts for converter units 102a-102c at low speed operation. By avoiding the additional cooling, additional thermal management and/or oversized power devices, the life of the electrical system 100 can be increased and the power density of the motor controller can be increased. The estimated temperature reduction for the CS module is approximately 60° C., for example. The reduced temperature allows for a more efficient and higher power density motor controller (e.g. switches 102a-102c).

A method includes selectively disabling or enabling inner switches, e.g. inner switches 110a and 110b or 210a and 210b, in a hybrid power converter phase unit, e.g. hybrid power converter phase unit 102a or 202a, with a controller, e.g. controller 105 or 205. Selectively disabling or enabling includes disabling or enabling PWM signals of the inner switches of the particular phase leg with the controller. If an absolute value of a measured current (i) at a voltage output of the particular phase leg, e.g. voltage output 106 or 206, is less than a pre-determined value $$\left(I_{ref}\cos\frac{\theta}{2}\right),$$

the PWM signals of the inner switches are enabled by the controller and the converter of the particular phase leg operates in 3L mode, as a typical 3L converter. This function is shown below by Equation 1, where $I_{ref}$ is the peak value of the phase current reference which is the known variable in a motor controller, and θ is the angle span for each phase leg.

$$|i| < I_{ref}\sin\frac{\pi-\theta}{2} = I_{ref}\cos\frac{\theta}{2} \qquad \text{Equation 1:}$$

If an absolute value of the measured current (i) is greater than or equal to the pre-determined value, as shown below by Equation 2, the controller disables the PWM signals of the inner switches and the hybrid power converter phase unit of this particular phase leg operates in 2L mode, as a typical 2L voltage source inverter.

$$|i| \geq I_{ref}\sin\frac{\pi-\theta}{2} = I_{ref}\cos\frac{\theta}{2} \qquad \text{Equation 2:}$$

Figure 3:
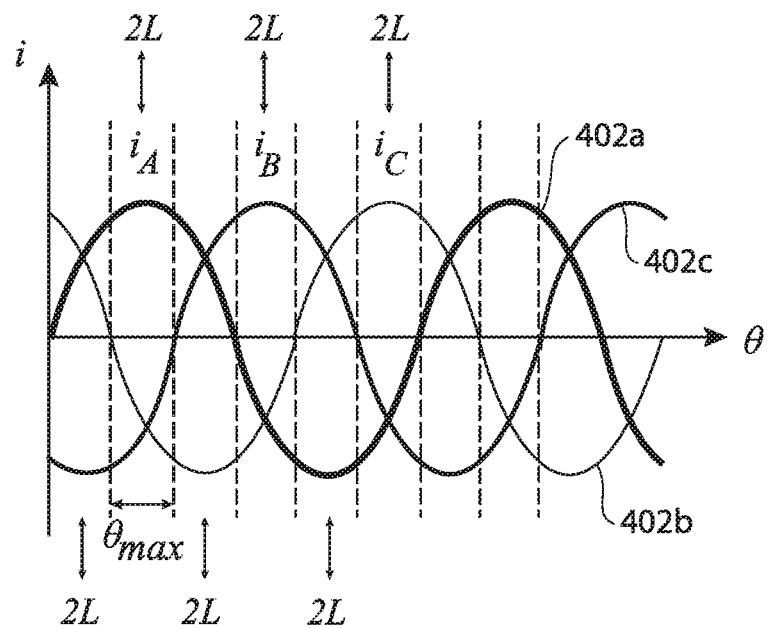
FIG. 3 is a graphical depiction of the transition between 2L and 3L mode in a three-phase hybrid power conversion system constructed in accordance with the present disclosure.

At the low-speed, high-torque motor operating conditions, the proposed control scheme enables the hybrid operation of both 2L and 3L topology, while sharing the same hardware. This mode is activated during the angle span θ (as shown in FIG. 3) for each phase leg. As shown in FIG. 3, the mode-transition criterion is provided as below in Equation 3:

$$\theta \leq \theta_{max} = \frac{\pi}{3}$$

As shown in FIG. 3, for a three phase hybrid power converter, e.g. a power conversion system 101 with three hybrid power converter phase units 102a-102c, each phase respectively switches to 2L mode in the vicinity of peak/valley current. Each phase is indicated graphically in FIG. 3, line 402a is a depiction of the phase associated with converter 102a, line 402b is a depiction of the phase associated with converter 102b, and line 402c is a depiction of the phase associated with converter 102c, for example. In a given line cycle [one peak and one valley], each phase has two 2L mode regions, making a total of six 2L regions. In between the 2L mode regions for a given phase, the converter operates in 3L mode. At any given time, only one converter phase unit, e.g. one phase leg, operates at 2L mode. In accordance with some embodiments, the maximum angle span of $\theta_{max}$ for each region is 60 degrees.

In a T-type topology, e.g. that of converter 102a, outer switches 108a and 108b are HB switches and tend to experience voltage stress double that of the inner switches 110a and 110b, e.g. common-source switches, and are implemented with higher voltage devices to withstand full DC voltage. Therefore, HB switches 108a and 108b can work alone at 2L mode without any voltage stress concern. In accordance with the embodiment of FIGS. 4A-4B, in an ANPC topology, outer switches 208a and 208b naturally each have two physical devices 207a and 207b in series. Although each device 207a and 207b inside the outer switch is rated for half voltage, they will be controlled by the same gate signals to form a series switch so as to withstand the doubled voltage without voltage stress concern. With respect to FIGS. 1-3, under nominal operation of the T-type converter 102a, modulation index is high. HB switches 108a and 108b experience higher current loading than CS switches 110a and 110b. While at low speed, CS switches 110a and 110b suffer high current leading to high power loss and thermal stress. By operating the proposed hybrid scheme with 2L converter around current peak/valley, current loading is transferred to HB switches 108a and 108b which are designed to handle higher current. By utilizing these almost 'idle' HB switches 108a and 108b, therefore, the thermal stress of CS switches 110a and 110b is alleviated for low speed high torque operation.

Those skilled in the art will readily appreciate that at certain speed and torque conditions, applying the hybrid mode alone may reduce the thermal stress of CS switches 110a and 110b, but on the other hand, may increase the thermal stress for HB switches 108a and 108b too much. Therefore, in order to control and balance the loading sharing and reduce the overall power loss, instead of operating as 2L converter for the maximum angle span ($\theta_{max}$), the angle span can be reduced a bit if needed e.g. from 60 degrees to 50 degrees or even 40 degrees as needed, which means the mode-shift boundary $$\left(I_{ref}\cos\frac{\theta}{2}\right)$$

can be increased, i.e. the 3L mode operation region will be longer. This will permit the period of current conduction time of the half-bridge switches to reduce, so total conduction loss and switching loss will reduce. Drain-source on resistance will tend to be reduced due to the reduction of line cycle average loss (from thermal steady state point of view, given that the line frequency is not extremely low). So, the conduction loss can be further reduced. Therefore, the peak loss of the HB switches may also be a bit lower as the peak conduction loss gets lower. However, as a trade-off, the CS switches 110a and 110b may see a slightly higher loss.

With continued reference to FIGS. 1-4B, embodiments of the present disclosure act to move the loading from CS switches 110a and 110b to HB switches 108a and 108b, or from inner switches 210a-210b to outer switches 208a and 208b, and share thermal stress more evenly. This reduces CS switch's 110a and 110b or inner switches 210a-210b high conduction loss and thermal stress. The line voltage is still within +/−Vdc/2, (the line-line dv/dt is for full Vdc), keeping the features of 3L converter. The HB switches 108a and 108b will have higher conduction loss and switching loss (both Vdc stress and higher current will contribute to higher switching loss).

As shown in FIG. 1, some embodiments of the present disclosure optionally include DC-DC converter 112, the DC link voltage at inputs 104a and 104c can be potentially reduced to half, as an example, compared to full-DC link voltage hybrid mode. The phase voltage stress, line-line voltage stress, and dv/dt stress, are also reduced by half with DC-DC converter 112. Additionally, using DC-DC converter results in reduced switching and total loss for HB switches 108a and 108b. It is contemplated, however, that conduction loss may increase slightly due to low modulation index (M). The CS switches 110a and 110b experience reduced switching and conduction loss as well as increased conduction loss due to lower M. By lowering the DC link voltage by half, for example, total converter losses can be reduced, and a positive impact on the dc-ac motor drive with extremely low modulation index at low speed operation (moving the M to the better direction) can be achieved, while introduces only minor side-effect on DC-DC converter as the DC voltage ratio was designed at a normal range.

Those skilled in the art will readily appreciate that the embodiments of the present disclosure offer improved methods to control thermal stress as compared with traditional methods, e.g. oversized power module or cooling infrastructure. The methods and systems of the present disclosure, as described above and shown in the drawings, provide for electrical systems and methods to redistribute the current stress between the high stressed CS modules in the neutral path of the T-type converter to the near-idle HB power modules, thus alleviating the thermal stress of the CS modules. Moreover, the systems and methods described herein do not require hardware change or major software change, resulting in ease of implementation and low risk. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A power conversion system, comprising:
a hybrid power converter phase unit including three voltage inputs, a voltage output, a pair of outer switches between the voltage inputs and voltage output, and a pair of inner switches between the voltage inputs and the outer switches; and
a controller in electrical communication with the inner and outer switches, wherein the controller is configured to selectively disable or enable the inner switches by switching the inner switches OFF or ON, wherein the controller is configured to at least one of disable the inner switches when a current at the voltage inputs is within a disable threshold, or enable the inner switches when the current at the voltage inputs is outside of the disable threshold.

2. The system as recited in claim 1, wherein the inner switches are connected in series with one another.

3. The system as recited in claim 1, wherein the outer switches are connected in series with one another.

4. The system as recited in claim 1, wherein the outer switches form a half-bridge module.

5. The system as recited in claim 4, wherein the hybrid power converter phase unit has a T-type topology.

6. The system as recited in claim 1, wherein the hybrid power converter phase unit has an active neutral pointed clamped converter (ANPC) topology controlled by the controller, wherein each outer switch itself includes a series-controlled half-bridge module.

7. The system as recited in claim 1, wherein the inner switches form a common source module when the hybrid power converter has a T-type topology, and a half-bridge module when the hybrid power converter has a ANPC topology.

8. The system as recited in claim 1, further comprising a second hybrid power converter phase unit and a third hybrid power converter phase unit to form a three-phase power converter, both in electrical communication with the controller.

9. An electrical system, comprising:
a power conversion system including a hybrid power converter phase unit and a controller in electrical communication with the hybrid power converter phase unit, wherein the hybrid power converter phase unit includes three voltage inputs, a voltage output, a pair of outer switches between the voltage inputs and voltage output, and a pair of inner switches between the voltage inputs and the outer switches, wherein the controller is in electrical communication with the inner switches and is configured to selectively disable or enable the inner switches and wherein the controller is configured to at least one of disable the inner switches when a current at the voltage inputs is within a disable threshold, or enable the inner switches when a current at the voltage inputs are outside of a disable threshold;
a DC-DC converter in electrical communication with the hybrid power converter phase unit to provide voltage to at least one of the negative or positive voltage inputs; and a battery bank in electrical communication with the DC-DC converter to provide power thereto.

10. The system as recited in claim 9, wherein the inner switches are connected in series with one another.

11. The system as recited in claim 9, wherein the outer switches are connected in series with one another.

12. The system as recited in claim 9, wherein the inner switches are common source switches.

13. The system as recited in claim 9, wherein the power conversion system includes a second hybrid power converter phase unit and a third hybrid power converter phase unit, both in electrical communication with the controller.

14. A method, comprising:
selectively disabling or enabling inner switches in a hybrid power converter phase unit with a controller such that the hybrid power converter phase unit is a 3-level converter when the inner switches are ON and enabled in a 3-level mode and a 2-level converter when the inner switches are OFF and disabled in a 2-level mode, wherein selectively disabling or enabling includes at least one of enabling the inner switches if a current is outside of a disable threshold, or disabling the inner switches if the current is within the disable threshold.

15. The method of claim 14, wherein selectively disabling or enabling includes disabling or enabling PWM signals of the inner switches.

16. The method of claim 14, wherein enabling the inner switches includes enabling the inner switches if an absolute value of the current is less than a pre-determined value.

17. The method of claim 14, wherein disabling the inner switches includes disabling the inner switches if an absolute value of the current is greater than a pre-determined value.

18. The method of claim 14, further comprising series-controlling outer switches in the hybrid power converter phase unit to withstand a full DC voltage in the 2-level mode, wherein the hybrid power converter phase unit has an ANPC topology.

\* \* \* \* \*